US012659528B2

(12) United States Patent
Ilola et al.

(10) Patent No.: US 12,659,528 B2
(45) Date of Patent: Jun. 16, 2026

(54) METHOD, AN APPARATUS AND A COMPUTER PROGRAM PRODUCT FOR VIDEO ENCODING AND VIDEO DECODING

(71) Applicant: Nokia Technologies Oy, Espoo (FI)

(72) Inventors: Lauri Aleksi Ilola, Tampere (FI);
Lukasz Kondrad, Munich (DE);
Sebastian Schwarz, Unterhaching (DE)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 18/846,796

(22) PCT Filed: Mar. 17, 2023

(86) PCT No.: PCT/FI2023/050154
§ 371 (c)(1),
(2) Date: Sep. 13, 2024

(87) PCT Pub. No.: WO2023/175243
PCT Pub. Date: Sep. 21, 2023

(65) Prior Publication Data
US 2025/0203135 A1 Jun. 19, 2025

(30) Foreign Application Priority Data

Mar. 17, 2022 (FI) ..................................... 20225240

(51) Int. Cl.
*H04N 21/235* (2011.01)
*H04N 19/46* (2014.01)
*H04N 19/70* (2014.01)

(52) U.S. Cl.
CPC ........... *H04N 21/235* (2013.01); *H04N 19/46* (2014.11); *H04N 19/70* (2014.11)

(58) Field of Classification Search
None
See application file for complete search history.

(56) References Cited

U.S. PATENT DOCUMENTS

2024/0022773 A1* 1/2024 Hamza ................. H04N 19/136

FOREIGN PATENT DOCUMENTS

WO WO 2021/258324 A1 12/2021

OTHER PUBLICATIONS

"Potential Improvements of ISO/IEC 23090-10 AMD 1 Support of packed video data," ISO/IEC JTC 1/SC 29/WG 03 N0395, MPEG Systems, Oct. 16, 2021.

(Continued)

*Primary Examiner* — Christopher Braniff
(74) *Attorney, Agent, or Firm* — McCarter & English LLP; Benjamin A. Ailes

(57) ABSTRACT

The embodiments relate to a method for encoding and decoding, and to apparatuses for the same. The method for encapsulating includes receiving a visual volumetric video-based coding bitstream containing common atlas bitstream and one or more atlas bitstreams; storing the common atlas bitstream and the one of the one or more atlas bitstreams in samples of one track or in an item data of one item in a file; providing a signaling in the file that indicates that the samples of the one track or the item data of the one item contains both common atlas data and atlas data; and writing in the file the signaling and the samples of the one track or the item data of the one item containing both common atlas data and atlas data. The embodiments also relate to a method for decapsulating and apparatuses for implementing the method for encapsulating and decapsulating.

19 Claims, 8 Drawing Sheets

(56) References Cited

OTHER PUBLICATIONS

Oh, S. (LG Electronics) "(34.1) Carriage of multiple atlases," ISO/IEC JTC1/SC29/WG11 MPEG2019/m54292, Coding of Moving Pictures and Audio, Jun.-Nov. 2020.

"Information technology—Coded representation of immersive media—Part 10: Carriage of visual volumetric video-based coding data," ISO/IEC JTC1/SC 29/WG 3, Aug. 31, 2021.

Kondrad, L. et al., "[39.1] Alignment with ISO/IEC 23090-5 $2^{nd}$ edition," ISO/IEC JTC1/SC29/WG3 m55727, Coding of Moving Pictures and Audio, Jan. 4, 2021.

Ilola, L. et al., "[V3C Systems] Clarifications about atlas tracks," ISO/IEC JTC1/SC29/WG3 m59320, Coding of Moving Pictures and Audio, Apr. 19, 2022.

* cited by examiner

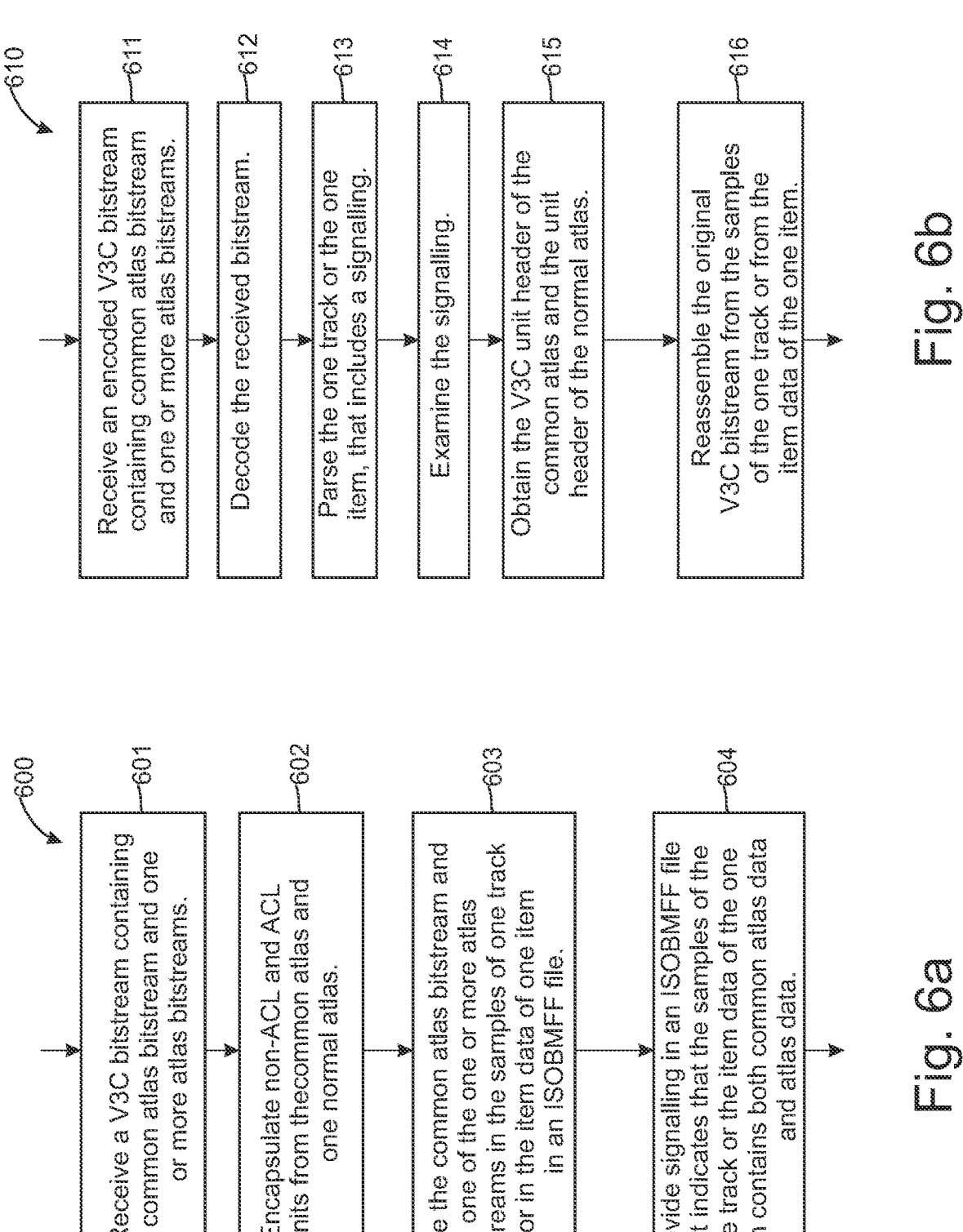

610

611 Receive an encoded V3C bitstream containing common atlas bitstream and one or more atlas bitstreams.

612 Decode the received bitstream.

613 Parse the one track or the one item, that includes a signalling.

614 Examine the signalling.

615 Obtain the V3C unit header of the common atlas and the unit header of the normal atlas.

616 Reassemble the original V3C bitstream from the samples of the one track or from the item data of the one item.

601 Receive a V3C bitstream containing common atlas bitstream and one or more atlas bitstreams.

602 Encapsulate non-ACL and ACL units from the common atlas and one normal atlas.

603 Store the common atlas bitstream and one of the one or more atlas bitstreams in the samples of one track or in the item data of one item in an ISOBMFF file.

604 Provide signalling in an ISOBMFF file that indicates that the samples of the one track or the item data of the one item contains both common atlas data and atlas data.

METHOD, AN APPARATUS AND A COMPUTER PROGRAM PRODUCT FOR VIDEO ENCODING AND VIDEO DECODING

CROSS REFERENCE TO RELATED APPLICATION

This patent application is a U.S. National Stage application of International Patent Application Number PCT/FI2023/050154 filed Mar. 17, 2023, which is hereby incorporated by reference in its entirety, and claims priority to FI 20225240 filed Mar. 17, 2022.

TECHNICAL FIELD

The present solution generally relates to coding of volumetric video.

BACKGROUND

Volumetric video data represents a three-dimensional (3D) scene or object, and can be used as input for AR (Augmented Reality), VR (Virtual Reality), and MR (Mixed Reality) applications. Such data describes geometry (Shape, size, position in 3D space) and respective attributes (e.g., color, opacity, reflectance, . . . ), and any possible temporal transformations of the geometry and attributes at given time instances (like frames in 2D video). Volumetric video can be generated from 3D models, also referred to as volumetric visual objects, i.e., CGI (Computer Generated Imagery), or captured from real-world scenes using a variety of capture solutions, e.g., multi-camera, laser scan, combination of video and dedicated depth sensors, and more. Also, a combination of CGI and real-world data is possible. Examples of representation formats for volumetric data comprise triangle meshes, point clouds, or voxels. Temporal information about the scene can be included in the form of individual capture instances, i.e., "frames" in 2D video, or other means, e.g., position of an object as a function of time.

Motion Picture Expert Group's (MPEG) Immersive Video (MIV) based Visual Volumetric Video-based Coding (V3C) bitstreams always include common atlas data which, according to ISO/IEC 23090-10, is always stored as a dedicated track with sample entry of type 'v3cb'. While MIV supports multiple atlases, it is fairly common scenario that the bitstream would only contain a single atlas. The requirement to store common atlas data always as a dedicated track may complicate the encapsulation of such content from the file format perspective and may result in unnecessary file overhead. This scenario could remanifest itself in any future application of V3C, such as mesh coding.

SUMMARY

The scope of protection sought for various embodiments of the invention is set out by the independent claims. The embodiments and features, if any, described in this specification that do not fall under the scope of the independent claims are to be interpreted as examples useful for understanding various embodiments of the invention.

Various aspects include a method, an apparatus and a computer readable medium comprising a computer program stored therein, which are characterized by what is stated in the independent claims. Various embodiments are disclosed in the dependent claims.

According to a first aspect, there is provided an apparatus for encapsulating comprising means for receiving a visual volumetric video-based coding bitstream containing common atlas bitstream and one or more atlas bitstreams; means for storing the common atlas bitstream and the one of the one or more atlas bitstreams in samples of one track or in an item data of one item in a file; means for providing an signaling in the file that indicates that the samples of the one track or the item data of the one item contains both common atlas data and atlas data; and means for writing in the file the signaling and the samples of the one track or the item data of the one item containing both common atlas data and atlas data.

According to a second aspect, there is provided an apparatus for decapsulating, comprising means for reading a file comprising a track or an item of a visual volumetric video-based coding; means for examining signaling in the received track or item; means for determining, based on the signaling, that the track or item comprises one common atlas bitstream and one atlas bitstream; means for obtaining a V3V unit header of the common atlas and a V3V unit header of the atlas from the track or item; and means for reassembling the common atlas and atlas bitstreams from the read bitstream using the signaling.

According to a third aspect, there is provided a method for encapsulating, comprising receiving a visual volumetric video-based coding bitstream containing common atlas bitstream and one or more atlas bitstreams; storing the common atlas bitstream and the one of the one or more atlas bitstreams in samples of one track or in an item data of one item in a file; providing an signaling in the file that indicates that the samples of the one track or the item data of the one item contains both common atlas data and atlas data; and writing in the file the signaling and the samples of the one track or the item data of the one item containing both common atlas data and atlas data.

According to a fourth aspect, there is provided a method for decapsulating comprising reading a file comprising a track or an item of a visual volumetric video-based coding; examining signaling in the received track or item; determining, based on the signaling, that the track or item comprises one common atlas bitstream and one atlas bitstream; obtaining a V3V unit header of the common atlas and a V3V unit header of the atlas from the track or item; and reassembling the common atlas and atlas bitstreams from the read bitstream using the signaling.

According to a fifth aspect, there is provided an apparatus for encapsulating comprising at least one processor, memory including computer program code, the memory and the computer program code configured to, with the at least one processor, cause the apparatus to perform at least the following: receive a visual volumetric video-based coding bitstream containing common atlas bitstream and one or more atlas bitstreams; store the common atlas bitstream and the one of the one or more atlas bitstreams in samples of one track or in an item data of one item in a file; provide an signaling in the file that indicates that the samples of the one track or the item data of the one item contains both common atlas data and atlas data; and write in the file the signaling and the samples of the one track or the item data of the one item containing both common atlas data and atlas data.

According to a sixth aspect, there is provided an apparatus for decapsulating comprising at least one processor, memory including computer program code, the memory and the computer program code configured to, with the at least one processor, cause the apparatus to perform at least the following: read a file comprising a track or an item of a visual volumetric video-based coding; examine signaling in the received track or item; determine, based on the signaling, that the track or item comprises one common atlas bitstream and one atlas bitstream; obtain a V3V unit header of the common atlas and a V3V unit header of the atlas from the track or item; and reassemble the common atlas and atlas bitstreams from the read bitstream using the signaling.

According to seventh aspect, there is provided computer program product comprising computer program code configured to, when executed on at least one processor, cause an apparatus or a system to receive a visual volumetric video-based coding bitstream containing common atlas bitstream and one or more atlas bitstreams; store the common atlas bitstream and the one of the one or more atlas bitstreams in samples of one track or in an item data of one item in a file; provide an signaling in the file that indicates that the samples of the one track or the item data of the one item contains both common atlas data and atlas data; and write in the file the signaling and the samples of the one track or the item data of the one item containing both common atlas data and atlas data.

According to an eighth aspect, there is provided computer program product comprising computer program code configured to, when executed on at least one processor, cause an apparatus or a system to reading a file comprising a track or an item of a visual volumetric video-based coding; examine signaling in the received track or item; determine, based on the signaling, that the track or item comprises one common atlas bitstream and one atlas bitstream; obtain a V3V unit header of the common atlas and a V3V unit header of the atlas from the track or item; and reassemble the common atlas and atlas bitstreams from the read bitstream using the signaling.

According to an embodiment, the signaling is provided through a unique character-code value of a sample entry type for a track.

According to an embodiment, the character-code value is three-, four-, five- or six-character-code value.

According to an embodiment, the signaling is provided through a sample entry of a track containing one V3CUnitHeaderBox corresponding to a V3C common atlas unit type and one V3CUnitHeaderBox corresponding to a V3C atlas unit type.

According to an embodiment, the signaling is provided through a unique four-character-code value of an item type in an ItemInfoEntry for an item.

According to an embodiment, the signaling is provided through associated item properties, at least one V3CUnitHeaderProperty corresponding to a V3C common atlas unit type and one or more V3CUnitHeaderProperty corresponding to a V3C atlas unit type.

According to an embodiment, non-atlas coding layer NAL units and atlas coding layer NAL units from the common atlas and one atlas are encapsulated to one track or item.

According to an embodiment, the file is in ISO Base Media File Format.

According to an embodiment, the item is marked as a primary item.

DESCRIPTION OF THE DRAWINGS

In the following, various embodiments will be described in more detail with reference to the appended drawings, in which

FIG. 6*a* is a flowchart illustrating an encoding method according to an embodiment;

FIG. 6*b* is a flowchart illustrating a decoding method according to another embodiment.

FIG. 6*b* shows an example of a decoding apparatus according to an embodiment.

DESCRIPTION OF EXAMPLE EMBODIMENTS

The following description and drawings are illustrative and are not to be construed as unnecessarily limiting. The specific details are provided for a thorough understanding of the disclosure. However, in certain instances, well-known or conventional details are not described in order to avoid obscuring the description. References to one or an embodiment in the present disclosure can be, but not necessarily are, reference to the same embodiment and such references mean at least one of the embodiments.

Reference in this specification to "one embodiment" or "an embodiment" means that a particular feature, structure, or characteristic described in connection with the embodiment in included in at least one embodiment of the disclosure.

Figure 1:
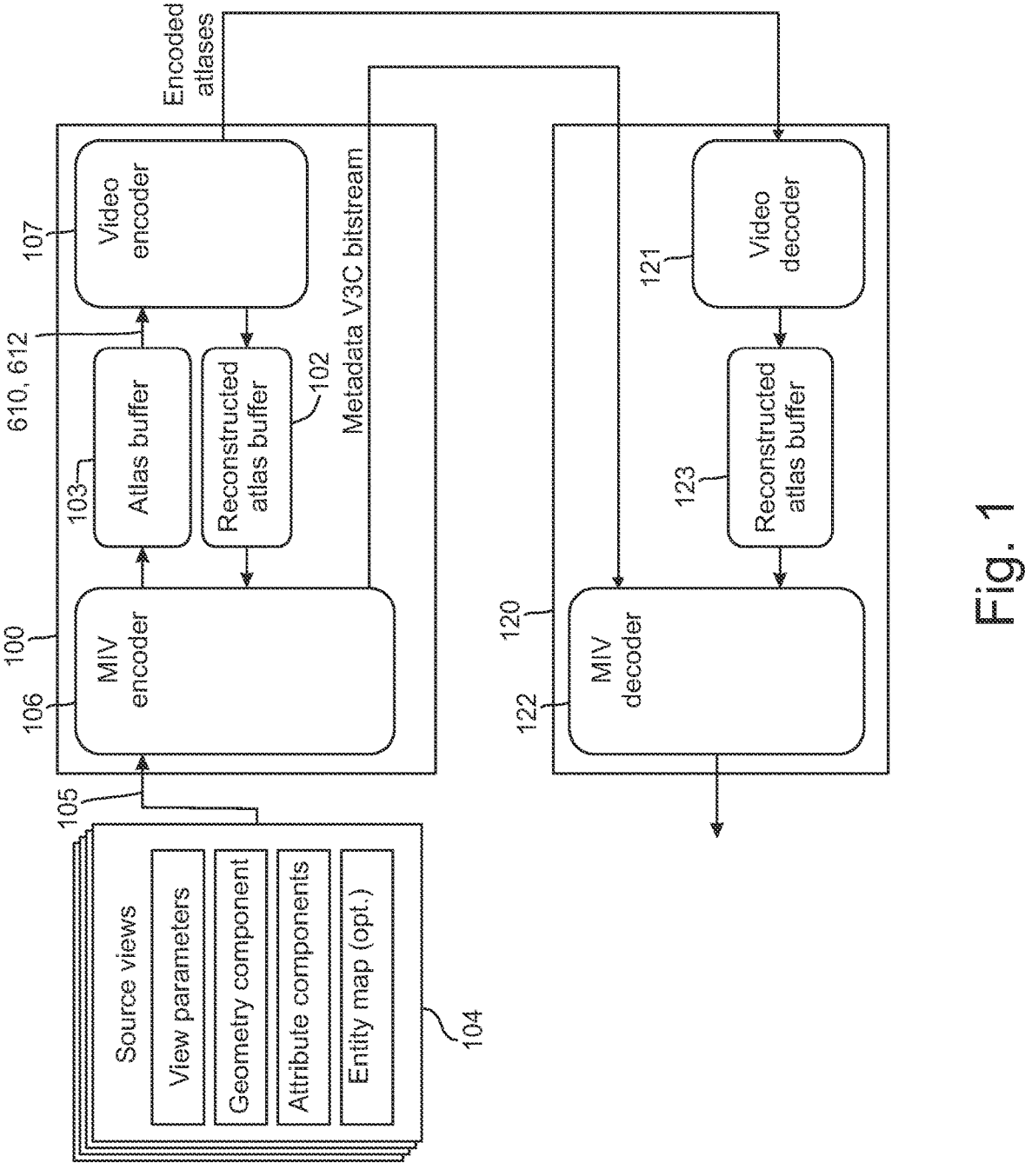
FIG. 1 illustrates as a simplified block diagram an example of a pipeline for MPEG-I Immersive Video.

FIG. 1*a* illustrates as a simplified block diagram an example of a pipeline for MPEG-I Immersive Video from encoding input views, texture and geometry at an encoder 100, to decoding at a decoder 120, in accordance with an embodiment. The encoder 100 comprises two encoding sections: a first encoding section 106 implementing the MPEG-I Immersive Video, which may also be called as a MIV encoder, and a second encoding section 107 implementing the other video encoding aspects, which may also be called as a video encoder in this specification. The MIV encoder 106 has a reconstructed atlas buffer 102 and an atlas buffer 103 which both are also accessible by the video encoder 107 for writing. In other words, it can be regarded that the reconstructed atlas buffer 102 and the atlas buffer 103 are shared by both the MIV encoder 106 and the video encoder 107. The MIV encoder 106 can use the atlas buffer 103 for storing generated atlases to be used by the video encoder 107 and the reconstructed atlas buffer 102 as prediction reference data. The decoder 120 comprises two decoding sections: a first decoding section 121 implementing video decoding aspects for decoding the encoded video, and a second encoding section 301 implementing the decoding operations of the test model of the MPEG-I Immersive Video. The first decoding section may also be called as a video decoder 121 and the second encoding section may also be called as a MIV decoder 122 in this specification.

An input 105 to the MIV encoder comprises of a list of source views 104. The source views represent projections, such as equirectangular, perspective, or orthographic projection, of a 3D real or virtual scene. The source views are associated with view parameters like camera intrinsics, camera extrinsics, geometry quantization, etc. A source view may have a geometry component and may also have a texture attribute component. Additional optional attributes per source view may comprise an entity map and a transparency attribute component.

Source views can be divided into multiple groups, for example to help outputting local coherent projections of important regions (e.g., belonging to foreground objects or occluded regions) in the atlases per group as opposed to having fewer samples of those regions when processing all source views as a single group. An automatic process may be implemented to select views per group, based on the view parameters list and the number of groups to obtain. The source views are being distributed accordingly in multiple branches, and each group is encoded independently of each other.

The MIV encoder 106 produces a single file according to the V3C sample stream format containing a single V3C sequence. The MIV encoder 106 also produces a bitstream carrying metadata of the V3C'.

The atlas data generated by the MIV encoder 106 and possibly stored in the atlas buffer 103, is provided to the video encoder 107 which generates encoded atlases for transmission to the decoder 120. The bitstream carrying metadata of the V3C may also be delivered to the decoder 120.

The MIV decoder 122 already uses as input the reconstructed geometry and atlas buffers 123 from the video decoder 121 and does not require specific orchestration as for the encoding stage; it however receives signaling of MIV prediction references so that it can reconstruct actual values from the encoded residual data.

The MIV encoder 106 and MIV decoder 122 utilize specific signaling to indicate that the predictive MIV is enabled, and to enable a symmetric, identical prediction at the encoder 100 and the decoder 120.

Figure 2A:
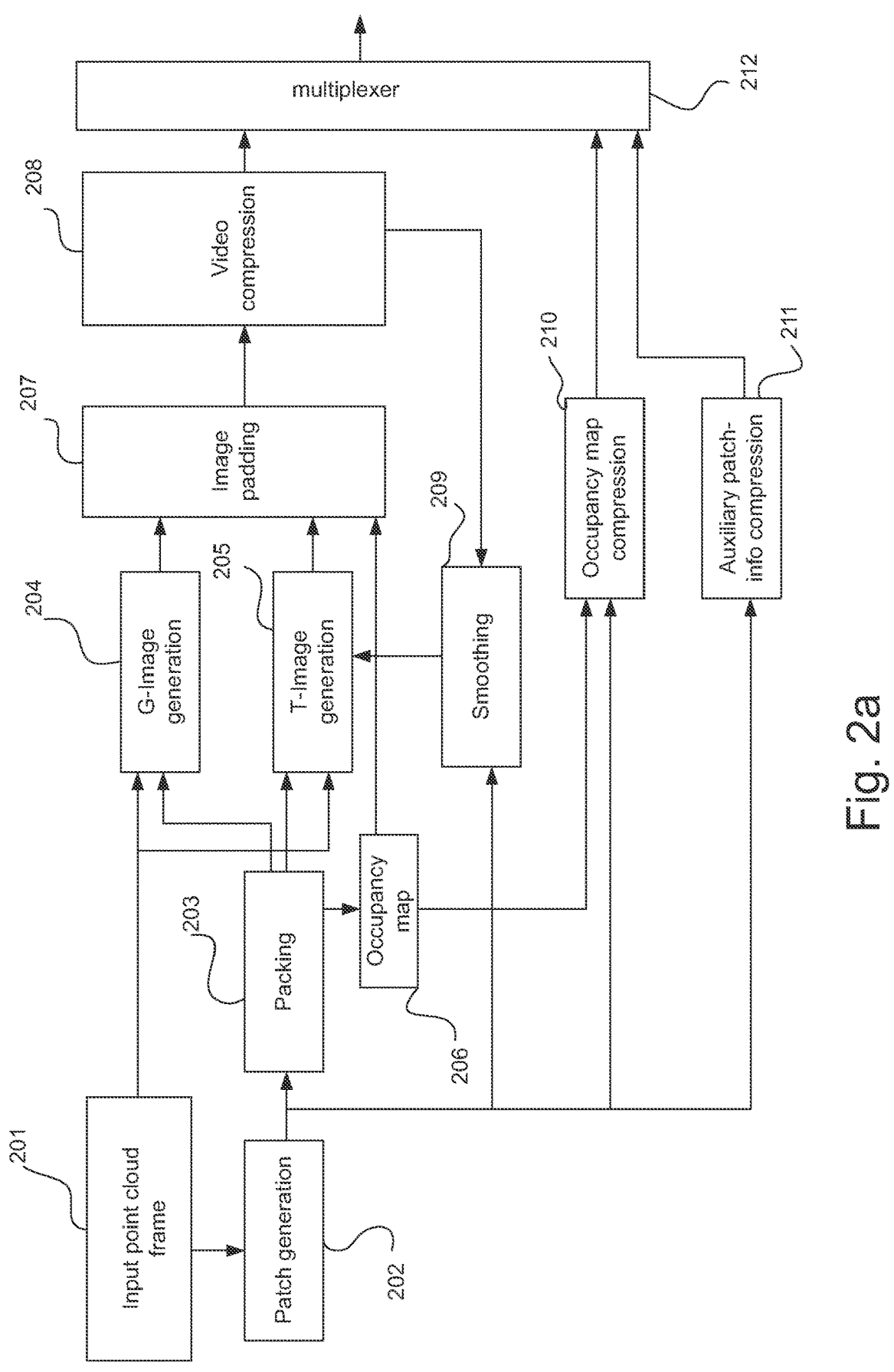
FIG. 2*a* shows an example of a compression process of a volumetric video.

FIG. 2a illustrates an overview of an example of a compression process of a volumetric video. Such process may be applied for example in MPEG Video-based Point Cloud Coding (V-PCC). The process starts with an input point cloud frame 101 that is provided for patch generation 102, geometry image generation 104 and texture image generation 105.

The patch generation 102 process aims at decomposing the point cloud into a minimum number of patches with smooth boundaries, while also minimizing the reconstruction error. For patch generation, the normal at every point can be estimated. An initial clustering of the point cloud can then be obtained by associating each point with one of the following six oriented planes, defined by their normals:

(1.0, 0.0, 0.0),
(0.0, 1.0, 0.0),
(0.0, 0.0, 1.0),
(−1.0, 0.0, 0.0),
(0.0, −1.0, 0.0), and
(0.0, 0.0, −1.0)

More precisely, each point may be associated with the plane that has the closest normal (i.e., maximizes the dot product of the point normal and the plane normal).

The initial clustering may then be refined by iteratively updating the cluster index associated with each point based on its normal and the cluster indices of its nearest neighbors. The final step may comprise extracting patches by applying a connected component extraction procedure.

Patch info determined at patch generation 102 for the input point cloud frame 101 is delivered to packing process 103, to geometry image generation 104 and to texture image generation 105. The packing process 103 aims at mapping the extracted patches onto a 2D plane, while trying to minimize the unused space, and guaranteeing that every T×T (e.g., 16×16) block of the grid is associated with a unique patch. It should be noticed that T may be a user-defined parameter. Parameter T may be encoded in the bitstream and sent to the decoder.

The used simple packing strategy iteratively tries to insert patches into a W×H grid. W and H may be user-defined parameters, which correspond to the resolution of the geometry/texture images that will be encoded. The patch location is determined through an exhaustive search that is performed in raster scan order. The first location that can guarantee an overlapping-free insertion of the patch is selected and the grid cells covered by the patch are marked as used. If no empty space in the current resolution image can fit a patch, then the height H of the grid may be temporarily doubled, and search is applied again. At the end of the process, H is clipped so as to fit the used grid cells.

The geometry image generation 104 and the texture image generation 105 are configured to generate geometry images and texture images respectively. The image generation process may exploit the 3D to 2D mapping computed during the packing process to store the geometry and texture of the point cloud as images. In order to better handle the case of multiple points being projected to the same pixel, each patch may be projected onto two images, referred to as layers. For example, let H(u, y) be the set of points of the current patch that get projected to the same pixel (u, v). The first layer, also called a near layer, stores the point of H(u, v) with the lowest depth DO. The second layer, referred to as the far layer, captures the point of H(u, v) with the highest depth within the interval [D0, D0+Δ], where Δ is a user-defined parameter that describes the surface thickness. The generated videos may have the following characteristics:

Geometry: W×H YUV420-8 bit,
Texture: W×H YUV420-8 bit,

It is to be noticed that the geometry video is monochromatic. In addition, the texture generation procedure exploits the reconstructed/smoothed geometry in order to compute the colors to be associated with the re-sampled points.

The geometry images and the texture images may be provided to image padding 107. The image padding 107 may also receive as an input an occupancy map (OM) 106 to be used with the geometry images and texture images. The occupancy map 106 may comprise a binary map that indicates for each cell of the grid whether it belongs to the empty space or to the point cloud. In other words, the occupancy map (OM) may be a binary image of binary values where the occupied pixels and non-occupied pixels are distinguished and depicted respectively. The occupancy map may alternatively comprise a non-binary image allowing additional information to be stored in it. Therefore, the representative values of the DOM (Deep Occupancy Map) may comprise binary values or other values, for example integer values. It should be noticed that one cell of the 2D grid may produce a pixel during the image generation process. Such an occupancy map may be derived from the packing process 103.

The padding process 107 aims at filling the empty space between patches in order to generate a piecewise smooth image suited for video compression. For example, in a simple padding strategy, each block of T×T (e.g., 16×16) pixels is compressed independently. If the block is empty (i.e., unoccupied, i.e., all its pixels belong to empty space), then the pixels of the block are filled by copying either the last row or column of the previous T×T block in raster order. If the block is full (i.e., occupied, i.e., no empty pixels), nothing is done. If the block has both empty and filled pixels (i.e., edge block), then the empty pixels are iteratively filled with the average value of their non-empty neighbors.

The padded geometry images and padded texture images may be provided for video compression 108. The generated images/layers may be stored as video frames and compressed using for example the HM16.16 video codec according to the HM configurations provided as parameters. The video compression 108 also generates reconstructed geometry images to be provided for smoothing 109, wherein a smoothed geometry is determined based on the reconstructed geometry images and patch info from the patch generation 102. The smoothed geometry may be provided to texture image generation 105 to adapt the texture images.

The patch may be associated with auxiliary information being encoded/decoded for each patch as metadata. The auxiliary information may comprise index of the projection plane, 2D bounding box, 3D location of the patch.

For example, the following metadata may be encoded/decoded for every patch:

index of the projection plane

Index 0 for the planes (1.0, 0.0, 0.0) and (−1.0, 0.0, 0.0)

Index 1 for the planes (0.0, 1.0, 0.0) and (0.0, −1.0, 0.0)

Index 2 for the planes (0.0, 0.0, 1.0) and (0.0, 0.0, −1.0)

2D bounding box (u0, v0, u1, v1)

3D location (x0, y0, z0) of the patch represented in terms of depth $\delta 0$, tangential shift s0 and bitangential shift r0. According to the chosen projection planes, ($\delta 0$, s0, r0) may be calculated as follows:

Index 0, $\delta 0=x0$, $s0==0$ and $r0=y0$

Index 1, $\delta 0=y0$, $s0=z0$ and $r0=x0$

Index 2, $\delta 0=z0$, $s0=x0$ and $r0=y0$

Also, mapping information providing for each T×T block its associated patch index may be encoded as follows:

For each T×T block, let L be the ordered list of the indexes of the patches such that their 2D bounding box contains that block. The order in the list is the same as the order used to encode the 2D bounding boxes. L is called the list of candidate patches.

The empty space between patches is considered as a patch and is assigned the special index 0, which is added to the candidate patches list of all the blocks.

Let I be index of the patch, which the current T×T block belongs to, and let J be the position of I in L. Instead of explicitly coding the index I, its position J is arithmetically encoded instead, which leads to better compression efficiency.

The occupancy map consists of a binary map that indicates for each cell of the grid whether it belongs to the empty space or to the point cloud. One cell of the 2D grid produces a pixel during the image generation process.

The occupancy map compression 110 leverages the auxiliary information described in previous section, in order to detect the empty T×T blocks (i.e., blocks with patch index 0). The remaining blocks may be encoded as follows: The occupancy map can be encoded with a precision of a B0×B0 blocks. B0 is a configurable parameter. In order to achieve lossless encoding, B0 may be set to 1. In practice B0=2 or B0=4 results in visually acceptable results, while significantly reducing the number of bits required to encode the occupancy map.

The compression process may comprise one or more of the following example operations:

Binary values may be associated with B0×B0 sub-blocks belonging to the same T×T block. A value 1 associated with a sub-block, if it contains at least a non-padded pixel, and 0 otherwise. If a sub-block has a value of 1 it is said to be full, otherwise it is an empty sub-block.

If all the sub-blocks of a T×T block are full (i.e., have value 1). The block is said to be full. Otherwise, the block is said to be non-full.

A binary information may be encoded for each T×T block to indicate whether it is full or not.

If the block is non-full, an extra information indicating the location of the full/empty sub-blocks may be encoded as follows:

Different traversal orders may be defined for the sub-blocks, for example horizontally, vertically, or diagonally starting from top right or top left corner The encoder chooses one of the traversal orders and may explicitly signal its index in the bitstream.

The binary values associated with the sub-blocks may be encoded by using a run-length encoding strategy.

The binary value of the initial sub-block is encoded.

Continuous runs of 0s and 1s are detected, while following the traversal order selected by the encoder.

The number of detected runs is encoded.

The length of each run, except of the last one, is also encoded.

Figure 2B:
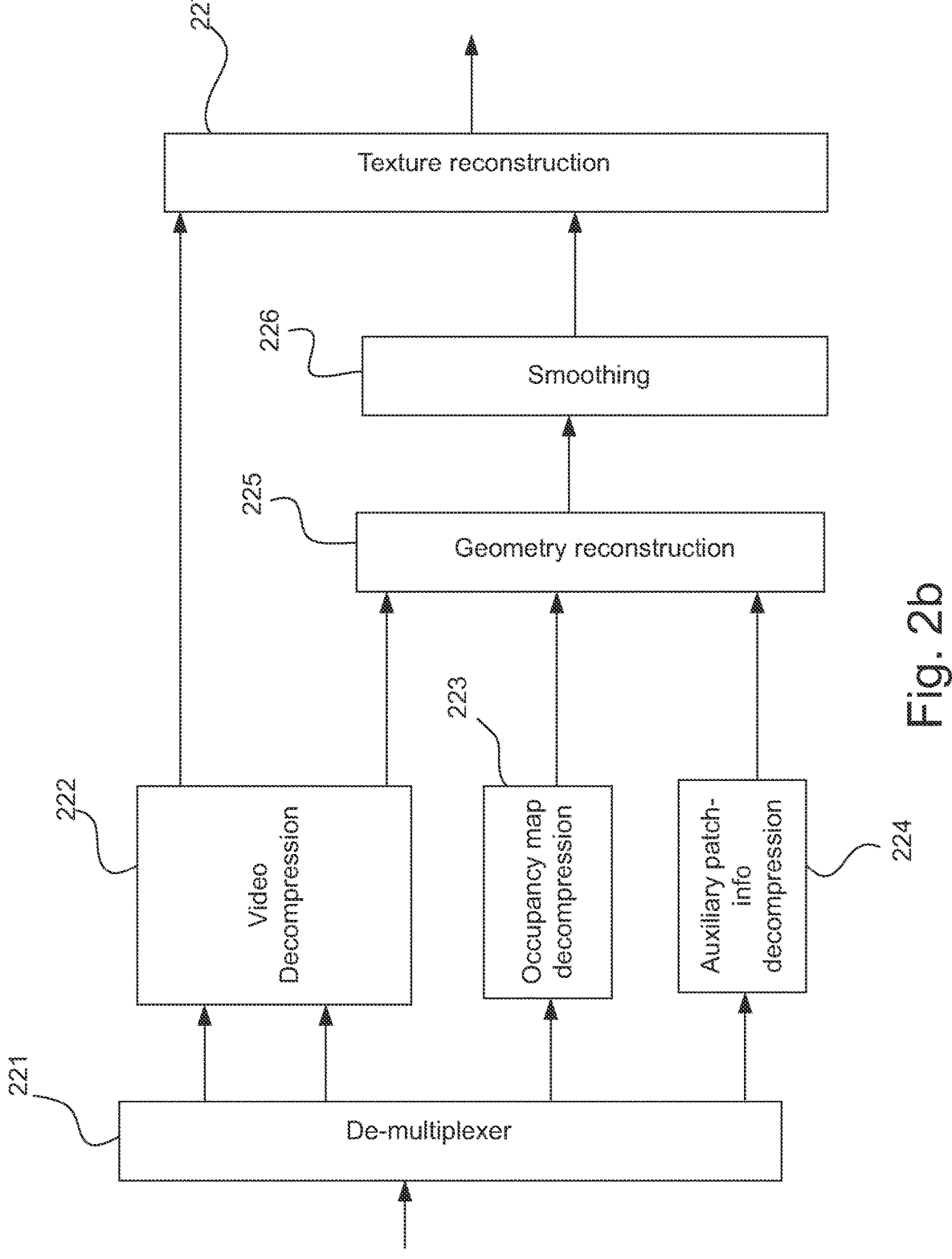
FIG. 2*b* shows an example of a de-compression process of a volumetric video.

FIG. 2b illustrates an overview of a de-compression process for MPEG Point Cloud Coding (PCC). A de-multiplexer 201 receives a compressed bitstream, and after de-multiplexing, provides compressed texture video and compressed geometry video to video decompression 202. In addition, the de-multiplexer 201 transmits compressed occupancy map to occupancy map decompression 203. It may also transmit a compressed auxiliary patch information to auxiliary patch-info compression 204. Decompressed geometry video from the video decompression 202 is delivered to geometry reconstruction 205, as are the decompressed occupancy map and decompressed auxiliary patch information. The point cloud geometry reconstruction 205 process exploits the occupancy map information in order to detect the non-empty pixels in the geometry/texture images/layers. The 3D positions of the points associated with those pixels may be computed by leveraging the auxiliary patch information and the geometry images.

The reconstructed geometry image may be provided for smoothing 206, which aims at alleviating potential discontinuities that may arise at the patch boundaries due to compression artifacts. The implemented approach moves boundary points to the centroid of their nearest neighbors. The smoothed geometry may be transmitted to texture reconstruction 207, which also receives a decompressed texture video from video decompression 202. The texture reconstruction 207 outputs a reconstructed point cloud. The texture values for the texture reconstruction are directly read from the texture images.

The point cloud geometry reconstruction process exploits the occupancy map information in order to detect the non-empty pixels in the geometry/texture images/layers. The 3D positions of the points associated with those pixels are computed by levering the auxiliary patch information and the geometry images. More precisely, let P be the point associated with the pixel (u, v) and let ($\delta 0$, s0, r0) be the 3D location of the patch to which it belongs and (u0, v0, u1, v1) its 2D bounding box. P can be expressed in terms of depth $\delta(u, v)$, tangential shift s(u, v) and bi-tangential shift r(u, v) as follows:

$$\delta(u, v) = \delta0 + g(u, v)$$

$$s(u, v) = s0 - u0 + u$$

$$r(u, v) = r0 - v0 + v$$

where g(u, v) is the luma component of the geometry image.

For the texture reconstruction, the texture values can be directly read from the texture images. The result of the decoding process is a 3D point cloud reconstruction.

There are alternatives to capture and represent a volumetric frame. The format used to capture and represent the volumetric frame depends on the process to be performed on it, and the target application using the volumetric frame. As a first example a volumetric frame can be represented as a point cloud. A point cloud is a set of unstructured points in 3D space, where each point is characterized by its position in a 3D coordinate system (e.g., Euclidean), and some corresponding attributes (e.g., color information provided as RGBA value, or normal vectors). As a second example, a volumetric frame can be represented as images, with or without depth, captured from multiple viewpoints in 3D space. In other words, the volumetric video can be represented by one or more view frames (where a view is a projection of a volumetric scene on to a plane (the camera plane) using a real or virtual camera with known/computed extrinsic and intrinsic). Each view may be represented by a number of components (e.g., geometry, color, transparency, and occupancy picture), which may be part of the geometry picture or represented separately. As a third example, a volumetric frame can be represented as a mesh. Mesh is a collection of points, called vertices, and connectivity information between vertices, called edges. Vertices along with edges form faces. The combination of vertices, edges and faces can uniquely approximate shapes of objects.

Depending on the capture, a volumetric frame can provide viewers the ability to navigate a scene with six degrees of freedom, i.e., both translational and rotational movement of their viewing pose (which includes yaw, pitch, and roll). The data to be coded for a volumetric frame can also be significant, as a volumetric frame can contain many numbers of objects, and the positioning and movement of these objects in the scene can result in many dis-occluded regions. Furthermore, the interaction of the light and materials in objects and surfaces in a volumetric frame can generate complex light fields that can produce texture variations for even a slight change of pose.

A sequence of volumetric frames is a volumetric video. Due to large amount of information, storage and transmission of a volumetric video requires compression. A way to compress a volumetric frame can be to project the 3D geometry and related attributes into a collection of 2D images along with additional associated metadata. The projected 2D images can then be coded using 2D video and image coding technologies, for example ISO/IEC 14496-10 (H.264/AVC) and ISO/IEC 23008-2 (H.265/HEVC). The metadata can be coded with technologies specified in specification such as ISO/IEC 23090-5. The coded images and the associated metadata can be stored or transmitted to a client that can decode and render the 3D volumetric frame.

In the following, a short reference of ISO/IEC 23090-5 Visual Volumetric Video-based Coding (V3C) and Video-based Point Cloud Compression (V-PCC) 2nd Edition is given. ISO/IEC 23090-5 specifies the syntax, semantics, and process for coding volumetric video. The specified syntax is designed to be generic, so that it can be reused for a variety of applications. Point clouds, immersive video with depth, and mesh representations can all use ISO/IEC 23090-5 standard with extensions that deal with the specific nature of the final representation. The purpose of the specification is to define how to decode and interpret the associated data (for example atlas data in ISO/IEC 23090-5) which tells a renderer how to interpret 2D frames to reconstruct a volumetric frame.

Two applications of V3C (ISO/IEC 23090-5) have been defined, V-PCC (ISO/IEC 23090-5) and MPEG Immersive Video (MIV) (ISO/IEC 23090-12). MIV and V-PCC use a number of V3C syntax elements with a slightly modified semantics. An example on how the generic syntax element can be differently interpreted by the application is pdu_projection_id.

In case of V-PCC, the syntax element pdu_projection_id specifies the index of the projection plane for the patch. There can be 6 or 18 projection planes in V-PCC, and they are implicit, i.e., pre-determined.

In case of MIV, pdu_projection_id corresponds to a view ID, i.e., identifies which view the patch originated from. View IDs and their related information is explicitly provided in MIV view parameters list and may be tailored for each content.

MPEG 3DG (ISO SC29 WG7) group has started a work on a third application of V3C—the mesh compression. It is also envisaged that mesh coding will reuse V3C syntax as much as possible and can also slightly modify the semantics.

To differentiate between applications of V3C bitstream that allow a client to properly interpret the decoded data, V3C uses the ptl_profile_toolset_idc parameter.

Figure 3:
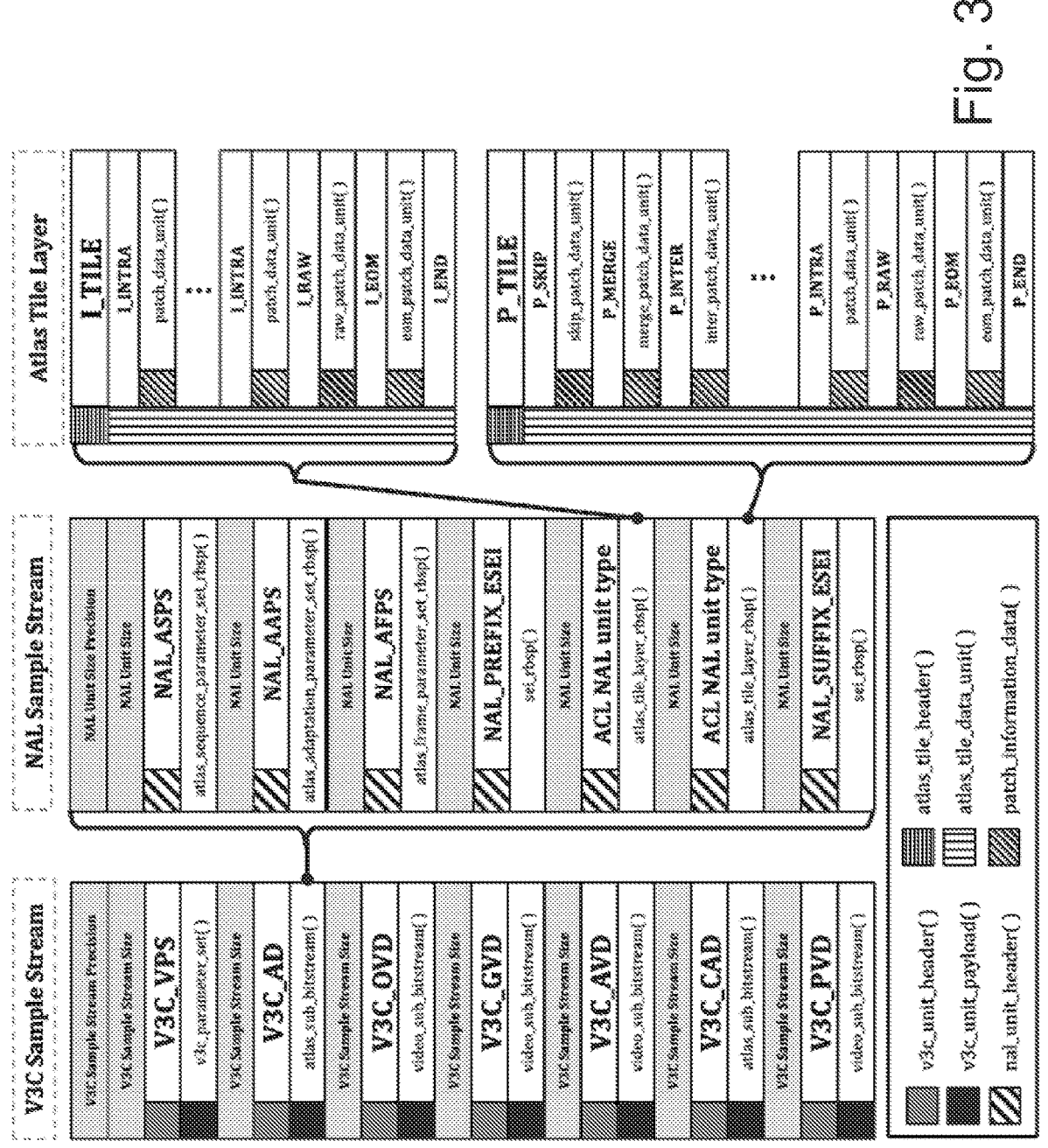
FIG. 3 shows an example of a V3C bitstream originated from ISO/IEC 23090-5.

V3C bitstream is a sequence of bits that forms the representation of coded volumetric frames and the associated data making one or more coded V3C sequences (CVS). V3C bitstream is composed of V3C units that contain V3C video sub-bitstreams, V3C atlas sub-bitstreams, or V3C Parameter Set (VPS). FIG. 3 illustrates an example of VC3 bitstream. Video sub-bitstream and atlas sub-bitstreams can be referred to as V3C sub-bitstreams. Each V3C unit has a V3C unit header and a V3C unit payload. A V3C unit header in conjunction with VPS information identify which V3C sub-bitstream a V3C unit contains and how to interpret it. An example of this is shown herein below:

| | Descriptor |
|---|---|
| v3c_unit_header( ) { | |
|     vuh_unit_type | u(5) |
|     if( vuh_unit_type == V3C_AVD || vuh_unit_type == V3C_GVD || | |
|         vuh_unit_type == V3C_OVD || vuh_unit_type == V3C_AD || | |
|         vuh_unit_type == V3C_CAD || vuh_unit_type == V3C_PVD ) | |
|         vuh_v3c_parameter_set_id | u(4) |
|     if( vuh_unit_type == V3C_AVD || vuh_unit_type == V3C_GVD || | |
|         vuh_unit_type == V3C_OVD || vuh_unit_type == V3C_AD || | |
|         vuh_unit_type == V3C_PVD ) | |

-continued

| | Descriptor |
|---|---|
| vuh_atlas_id | u(6) |
| if( vuh_unit_type == V3C_AVD ) { | |
| vuh_attribute_index | u(7) |
| vuh_attribute_partition_index | u(5) |
| vuh_map_index | u(4) |
| vuh_auxiliary_video_flag | u(1) |
| } else if( vuh_unit_type == V3C_GVD ) { | |
| vuh_map_index | u(4) |
| vuh_auxiliary_video_flag | u(1) |
| vuh_reserved_zero_12bits | u(12) |
| } else if( vuh_unit_type == V3C_OVD \|\| vuh_unit_type == V3C_AD \|\| | |
| vuh_unit_type == V3C_PVD ) | |
| vuh_reserved_zero_17bits | u(17) |
| else if( vuh_unit_type == V3C_CAD ) | |
| vuh_reserved_zero_23bits | u(23) |
| else | |
| vuh_reserved_zero_27bits | u(27) |
| } | |

V3C bitstream can be stored according to Annex C of ISO/IEC 23090-5, which specifies syntax and semantics of a sample stream format to be used by applications that deliver some or all of the V3C unit stream as an ordered stream of bytes or bits within which the locations of V3C unit boundaries need to be identifiable from patterns in the data.

CVS start with a VPS (V3C Parameter Set), which allows to interpret each V3C unit that vuh_v3c_parameter_set_id specifies the value of vps_v3c_parameter_set_id for the active V3C VPS. The VPS provides the following information about V3C bitstream among others:

Profile, tier, and level to which the bitstream is conformant.

Number of atlases that constitute to the V3C bitstream

Number of occupancies, geometry, attributes video-sub bitstreams

Number of maps for each geometry and attribute video components

Mapping information from attribute index to attribute type

| | Descriptor |
|---|---|
| v3c_parameter_set( numBytesInV3CPayload ) { | |
| profile_tier_level( ) | |
| vps_v3c_parameter_set_id | u(4) |
| vps_reserved_zero_8bits | u(8) |
| vps_atlas_count_minus1 | u(6) |
| for( k = 0; k < vps_atlas_count_minus1 + 1; k++ ) { | |
| vps_atlas_id[ k ] | u(6) |
| j = vps_atlas_id[ k ] | |
| vps_frame_width[ j ] | ue(v) |
| vps_frame_height[ j ] | ue(v) |
| vps_map_count_minus1[ j ] | u(4) |
| if( vps_map_count_minus1[ j ] > 0 ) | |
| vps_multiple_map_streams_present_flag[ j ] | u(1) |
| vps_map_absolute_coding_enabled_flag[ j ][ 0 ] = 1 | |
| vps_map_predictor_index_diff[ j ][ 0 ] = 0 | |
| for( i = 1; i <= vps_map_count_minus 1[ j ]; i++ ) { | |
| if( vps_multiple_map_streams_present_flag[ j ] ) | |
| vps_map_absolute_coding_enabled_flag[ j ][ i ] | u(1) |
| else | |
| vps_map_absolute_coding_enabled_flag[ j ][ i ] = 1 | |
| if( vps_map_absolute_coding_enabled_flag[ j ][ i ] == 0 ) { | |
| vps_map_predictor_index_diff[ j ][ i ] | ue(v) |
| } | |
| } | |
| vps_auxiliary_video_present_flag[ j ] | u(1) |
| vps_occupancy_video_present_flag[ j ] | u(1) |
| vps_geometry_video_present_flag[ j ] | u(1) |
| vps_attribute_video_present_flag[ j ] | u(1) |
| if( vps_occupancy_video_present_flag[ j ] ) | |
| occupancy_information( j ) | |
| if( vps_geometry_video_present_flag[ j ] ) | |
| geometry_information( j ) | |
| if( vps_attribute_video_present_flag[ j ] ) | |
| attribute_information( j ) | |
| } | |
| vps_extension_present_flag | u(1) |
| if( vps_extension_present_flag ) { | |
| vps_packing_information_present_flag | u(1) |

-continued

| | Descriptor |
|---|---|
| vps_miv_extension_present_flag | u(1) |
| vps_extension_6bits | u(6) |
| } | |
| if( vps_packing_information_present_flag ) { | |
|   for( k = 0 ; k <= vps_atlas_count_minus1; k++ ) { | |
|     j = vps_atlas_id[ k ] | |
|     vps_packed_video_present_flag[ j ] | |
|     if( vps_packed_video present_flag[ j ] ) | |
|       packing_information( j ) | |
|   } | |
| } | |
| if( vps_miv_extension_present_flag ) | |
|   vps_miv_extension( ) /*Specified in ISO/IEC 23090-12 */ | |
| if( vps_extension_6bits ) { | |
|   vps_extension_length_minus1 | ue(v) |
|   for( j = 0; j < vps_extension_length_minus1 + 1; j++ ) { | |
|     vps_extension_data_byte | u(8) |
|   } | |
| } | |
| byte_alignment( ) | |
| } | |

To reduce the number of video decoder instances required to reconstruct the compressed V3C content, V3C specification allows that occupancy, geometry, and attribute video components can be combined into one video component. How to unpack a packed video component is provided in syntax structure packing_information(j) present in VPS.

Common Atlas Data

Maximum dimensions of the 2D frame representation of a V3C content depend on the used video codec. Commercially deployed decoders are typically constrained in terms of video resolution and frame rate. To circumvent these limitations, V3C allows splitting the projected patches into multiple 2D frame representations and corresponding associated metadata, thus creating multiple atlases. To avoid duplicating data, such as projection parameters, between multiple atlases, V3C defines a common atlas data structure, which contains information that applies for all atlases of the presentation.

Syntax for common atlas sequence parameter set is described in the table below.

| | Descriptor |
|---|---|
| common_atlas_sequence_parameter_set_rbsp( ) { | |
|   casps_common_atlas_sequence_parameter_set_id | u(4) |
|   casps_log2_max_common_atlas_frame_order_cnt_lsb_minus4 | ue(v) |
|   casps_extension_present_flag | u(1) |
|   if( casps_extension_present_flag ) { | |
|     casps_miv_extension_present_flag | u(1) |
|     casps_extension_7bits | u(7) |
|   } | |
|   if( casps_miv_extension_present_flag ) | |
|     casps_miv_extension( ) /* Specified in ISO/IEC 23090-12 */ | |
|   if( casps_extension_7bits ) | |
|     while( more_rbsp_data( ) ) | |
|       casps_extension_data_flag | u(1) |
|   rbsp_trailing_bits( ) | |
| } | |

Syntax for common atlas frame data is described in the below table.

| | Descriptor |
|---|---|
| common_atlas_frame_rbsp( ) { | |
|    caf_common_atlas_sequence_parameter_set_id | u(4) |
|    caf_common_atlas_frm_order_cnt_lsb | u(v) |
|    caf_extension_present_flag | u(1) |
|    if( caf_extension_present_flag ) { | |
|       caf_miv_extension_present_flag | u(1) |
|       caf_extension_7bits | u(7) |
|    } | |
|    if( caf_miv_extension_present_flag ) | |
|       caf_miv_extension( ) /* Specified in ISO/IEC 23090-12 */ | |
|    if( caf_extension_7bits ) | |
|       while( more_rbsp_data( ) ) | |
|          caf_extension_data_flag | u(1) |
|    rbsp_trailing_bits( ) | |
| } | |

In MIV application of V3C common atlas data is used for example to carry information about the used projections, i.e. views, that describe how visual 2D patch data is projected back into 3D space. The views are shared between patches and atlases, thus benefitting from common storage mechanism. When delivering volumetric video as MPEG Immersive Video common atlas sequence parameter set and common atlas frame data are present, even if there would only be a single atlas.

Similar to normal atlas data, common atlas data is carried in NAL units (network abstraction layer) and specific values 48-51 for NAL unit types are reserved in V3C base specification ISO/IEC 23090-5 as described in the table below. The abbreviation ACL is for Atlas Coding Layer.

| nal_unit_type | Name of nal_unit_type | Content of NAL unit and RBSP syntax structure | NAL unit type class |
|---|---|---|---|
| . . . | . . . | . . . | . . . |
| 47 | NAL_AAPS | Atlas adaptation parameter set atlas_adaptation_parameter_set_rbsp( ) | non-ACL |
| 48 | NAL_CASPS | Common atlas sequence parameter set common_atlas_sequence_parameter_set_rbsp( ) | non-ACL |
| 49 | NAL_CAF_IDR | IDR common atlas frame common_atlas_frame_rbsp( ) | non-ACL |
| 50 | NAL_CAF_TRAIL | Common atlas frame common_atlas_frame_rbsp( ) | non-ACL |
| 51 . . . 55 | NAL_RSV_NACL_51 NAL_RSV_NACL_55 | Reserved non-ACL NAL unit types | non-ACL |
| . . . | . . . | . . . | . . . |

Box-Structured File Formats

Box-structured and hierarchical file format concepts have been widely used for media storage and sharing. The most well-known file formats in this regard are the ISO Base Media File Format (ISOBMFF) and its variants such as MP4 and 3GPP file formats.

ISOBMFF allows storage of timely captured audio/visual media streams, called media tracks. The metadata which describes the track is separated from the encoded bitstream itself. The format provides mechanisms to access media data in a codec-agnostic fashion from file parser perspective.

Sample DescriptionBox

SampleDescriptionBox is contained by SampleTableBox and provides detailed information about the coding type used, and any initialization information needed for that coding. The information stored in the SampleDescription-Box after the entry-count is both track-type and can also have variants within a track type. Which type of sample entry form is used is determined by the media handler, using a suitable form defined in ISO 14496-12, in a derived specification, or from registration.

```
aligned(8) abstract class SampleEntry (unsigned int(32) format)
    extends Box(format){
    const unsigned int(8)[6] reserved = 0;
    unsigned int(16) data_reference_index;
}
aligned(8) class SampleDescriptionBox (unsigned int(32) handler_type)
    extends FullBox('stsd', version, 0){
    int i ;
    unsigned int(32) entry_count;
    for (i = 1 ; i <= entry_count ; i++){
        SampleEntry( );              // an instance of a class derived
from SampleEntry
    }
}
```

The SampleEntry box may contain "extra boxes" not explicitly defined in the box syntax of ISO/IEC 14496-12. When present, such boxes shall follow all defined fields and should follow any defined contained boxes. Decoders shall presume a sample entry box could contain extra boxes and shall continue parsing as though they are present until the containing box length is exhausted.

TrackReferenceBox

Exactly one TrackReferenceBox can be contained within the TrackBox. If this box is not present, the track is not referencing any other track in any way. The reference array is sized to fill the reference type box. TrackReferenceBox provides a reference from the containing track to another track in the presentation. These references are typed using TrackReferenceTypeBoxes where there shall be at most one TrackReferenceTypeBox of a given type in a TrackReferenceBox.

```
aligned(8) class TrackReferenceBox extends Box ('tref') {
    TrackReferenceTypeBox [ ];
}
aligned(8) class TrackReferenceTypeBox (unsigned int(32) reference_type) extends Box(reference_type) {
    unsigned int(32) track_IDs[ ];
}
```

For example, a TrackReferenceTypeBox of reference_type 'hint' reference links from the containing hint track to the media data that it hints, i.e., tracks indicated by the track_IDs array within TrackReferenceTypeBox.

Track Groups

TrackGroupBox is contained by a TrackBox. TrackGroupBox enables indication of groups of tracks, where each group shares a particular characteristic or the tracks within a group have a particular relationship. TrackGroupBox contains zero or more boxes, and the particular characteristic or the relationship is indicated by the box type of the contained boxes. The contained boxes include an identifier, which can be used to conclude the tracks belonging to the same track group. The tracks that contain the same type of a contained box within the TrackGroupBox and have the same identifier value within these contained boxes belong to the same track group. Track groups are not used to indicate dependency relationships between tracks. Instead, the TrackReferenceBox is used for such purposes.

In order to handle situations where the file author requires certain actions on the player or renderer ISO/IEC 14496-12 specifies a mechanism that enables players to simply inspect a file to find out such requirements for rendering a bitstream and stops legacy players from decoding and rendering files that require further processing. In other words, the content (tracks) should only be decoded by players that present it correctly.

A Restricted Sample Entry is defined as a sample entry on which the following transformation procedure has been applied:

The four-character code of the sample entry is replaced by a new sample entry code 'resv' meaning restricted video.

A RestrictedSchemeInfoBox is added to the sample description, leaving all other boxes unmodified.

The original sample entry type is stored within an OriginalFormatBox contained in the RestrictedSchemeInfoBox.

The original sample entry type is contained in the OriginalFormatBox located in the RestrictedSchemeInfoBox. The exact nature of the restriction is defined in the SchemeTypeBox, and the data needed for that scheme is stored in the SchemeInformationBox.

Non-timed data in ISOBMFF is represented by one sample which is described by a logical concept called an item. Items are described by a number of boxes that are stored in the meta box, 'meta'. Similar to a sample entry in the case of tracks, each item has an item info entry that is stored in an item information box, 'iinf'. In contrast to timed samples, non-timed sample data may either be stored in the media data box, or in an item data box, 'idat', that is stored in the meta box.

Storage of Common Atlases in ISOBMFF

Support for multiple atlases was defined in ISO/IEC 23090-10 1st edition and clarifications on the storage were made in the first amendment of ISO/IEC 23090-10. V3C atlas tracks use V3CAtlasSampleEntry which extends VolumetricVisualSampleEntry with a sample entry type of 'v3c1', 'v3cg', 'v3cb', 'v3a1', or 'v3ag'. Following restrictions are set for V3C atlas tracks:

A V3C atlas track shall not carry ACL NAL units belonging to more than one atlas.

A V3C atlas track sample entry contains a V3CConfigurationBox and a V3CUnitHeaderBox.

V3C atlas tracks with sample entry type 'v3cb', 'v3a1' and 'v3ag' are relevant for carrying multiple atlases. Depending on V3C bitstream content or sample entry type of the atlas track, following restrictions are placed on V3C atlas tracks:

When the V3C bitstream contains a single atlas, a V3C atlas track with sample entry 'v3c1' or 'v3cg' shall be used.

When the V3C bitstream contains multiple atlases, each atlas bitstream shall be stored as a separate V3C atlas track with the sample entry type 'v3a1' or 'v3ag'. One additional track with the sample entry type 'v3cb' shall be present, which is the entry point track referencing the other atlas tracks with 'v3a1' or 'v3ag'.

Under the 'v3a1' and 'v3ag' sample entry, the num_of_v3c_parameter_sets shall be equal to 0. The V3C parameter set shall be stored in the sample entry of the atlas track with 'v3cb'.

A V3C atlas track with sample entry type 'v3cb' shall not include any ACL NAL units.

Each sample in a V3C atlas track with sample entry of type 'v3c1', 'v3cg', 'v3a1', or 'v3ag' or V3C atlas tile track with sample entry of type 'v3t1' corresponds to a single coded atlas access unit or part of it, set of atlas NAL units that are associated with each other according to a specified classification rule, are consecutive in decoding order, and contain all atlas NAL units pertaining to one particular output time. Under these sample entries, each sample in the V3C atlas track(s) or V3C atlas tile tracks corresponds to a coded atlas access unit associated with the same vuh_atlas_id as indicated in the V3C unit header box in the sample entry.

Each sample in a V3C atlas track with sample entry 'v3cb' corresponds to one or more coded common atlas access unit(s). Common atlas access unit is a set of common atlas non-ACL NAL units that are associated with each other according to a specified classification rule, are consecutive in decoding order, and contain all common atlas NAL unit(s) pertaining to one particular output time ISO/IEC 23090-5 describes how an atlas access unit or common atlas access unit can be determined in an atlas bitstream.

Similar to V3C atlas track, a V3C atlas item represents an independently decodable coded atlas access unit or coded common atlas access unit depending on the item type.

ISO/IEC 23090-10 defines storage capabilities for V3C bitstream consisting of multiple atlases, e.g. MIV compressed volumetric video. According to ISO/IEC 23090-10, in the case of MIV there is always one common atlas bitstream, identified through V3C unit header type V3C_CAD, and one or more atlas bitstreams identified through V3C unit header type V3C_AD. In ISOBMFF each atlas bitstream is stored as samples of one or more V3C atlas tracks, where samples of each V3C atlas track can only contain data belonging to a single atlas, identified uniquely by atlas ID in V3C unit header. Common atlas bitstream is stored separately as its own track, which means that in ISOBMFF for MIV encoded content there will always be at least two tracks for storing atlas data. One track is V3C atlas track of type 'v3cb' for common atlas data and another track is V3C atlas track of type 'v3a1', or 'v3ag' for atlas data.

Figures 4, 5:
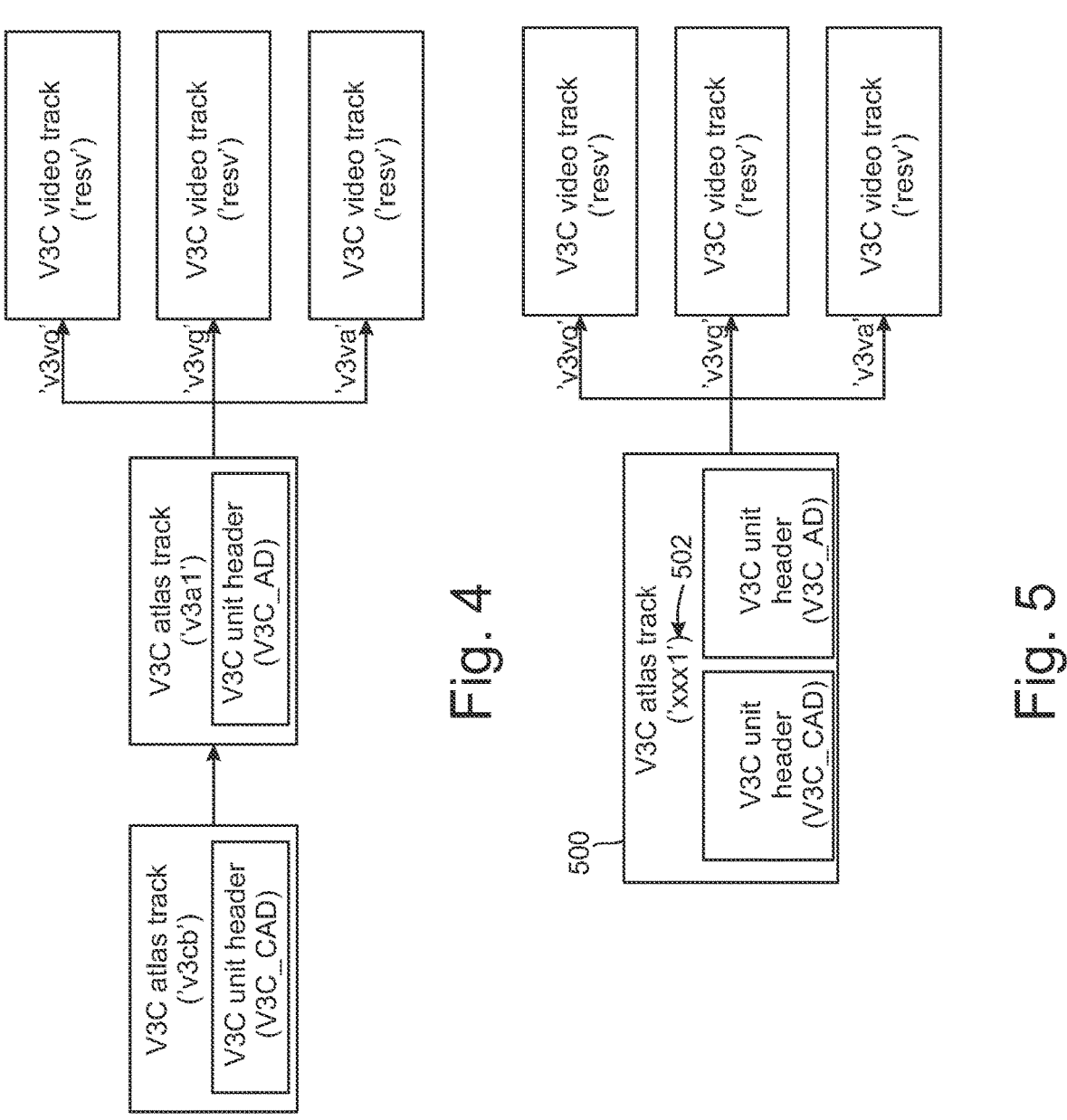
FIG. 4 shows an example of a file format structure consisting of common atlas data track and atlas data track in two separate tracks.
FIG. 5 shows an example of a design with storing common atlas data and atlas data in the same track.

This storage design, specified in ISO/IEC 23090-10, is therefore not optimal. The design creates overhead, for example by duplicating sample data related information for the two atlas tracks, unnecessarily increases the parsing complexity and requires further synchronization of one additional track. Example of the file format structure consisting of common atlas data track and atlas data track in two separate tracks is shown in FIG. 4.

When the content consists of common atlas and only one atlas, it would be beneficial to store common atlas data and atlas data in the same atlas track to reduce file format level data duplication and simplify the overall design of the file. Currently storage of common atlas data and atlas data in the same track is not possible and relevant file format level structures indicating shared usage of an atlas track are missing.

The same problem also applies to non-timed V3C bitstream stored as items, and similar improved design could be used to reduce the number of atlas items required for storing MIV bitstreams.

In the following, there is disclosed a method and apparatus in which the abovementioned problem is at least partly addressed. FIG. 6a depicts a method 600 for encoding according to an example embodiment as a flow diagram. The method may be implemented, for example, in an encoder 107 of FIG. 1, which may be part of an apparatus of FIG. 7a. The encoder 107 may have some specific arrangement e.g. computer code to be executed by the processing circuitry 12, for example, for performing the following tasks but the encoder 107 may differ from the following description. The encoder 107 receives 601 a V3C bitstream comprising a common atlas bitstream and one or more atlas bitstreams e.g. from the atlas buffer 103. An encapsulator 1101 of the encoder encapsulates 602 non-ACL and ACL NAL units from the common atlas and one normal atlas to one track/item 500. A simplified example of a design with storing common atlas data and atlas data in the same track is illustrated in FIG. 5. The one V3C atlas track 500 includes a V3C unit header of the common atlas V3C_CAD and a V3C unit header of the normal atlas V3C_AD. A file constructor 1102 of the encoder stores 603 the common atlas bitstream and one of the one or more atlas bitstreams in the samples of one track 500 or in the item data of one item in an ISOBMFF file 714. An indication composer 1103 of the encoder 107 then forms 604 signaling that indicates that the stored location, i.e. the samples of the one track or the item data of the one item, contains both the common atlas data and atlas data. In other words, an indication 502 is provided of the presence of common atlas and normal atlas data in the same track/item 500 as well as describing the atlases and included in the ISOBMFF file 714. The ISOBMFF file 714 may be stored in a memory 14, for example and/or transmitted by a communication interface 16 of the encoder 107 to a decoder 120 either directly or via a communication network or via some other appropriate way.

According to an embodiment, the encoder 107 may insert an indication that a track contains data from V3C_CAD and V3C_AD through unique sample entry type, i.e., selecting a value to the sample entry type parameter which indicates that the track contains data from a common atlas data bitstream and atlas data bitstream.

According to an embodiment, some unique sample entry types are reserved which indicate that all parameter sets are present in the sample entry or that they are stored in the samples of the track. For example, the value for the first sample entry type could be 'xxx1' and the value for the latter sample entry type could be 'xxxg'. The unique sample sample entry indicates that the sample entry contains multiple V3C unit header boxes, one of which corresponds to V3C common atlas unit type (vuh_unit_type==V3C_CAD).

According to an embodiment, a unique item type parameter is used to indicate that an item contains data from V3C_CAD and V3C_AD. For example, the value for the unique item type parameter could be 'yyy1'. The unique item type indicates that the item is associated with multiple V3C unit header properties, one of which corresponds to V3C common atlas unit type (vuh_unit_type==V3C_CAD).

In the example in FIG. 5, a V3C atlas track with sample entry type 'xxx1' is used to store common atlas data and atlas data in the samples of the same track. The sample entry stores two V3C unit header boxes, one for V3C_CAD and one for V3C_AD respectively.

V3C atlas tracks may use V3CAtlasSampleEntry which extends VolumetricVisualSampleEntry with a sample entry type of 'v3c1', 'v3cg', 'v3cb', 'v3a1', 'v3ag', 'xxx1' or 'xxxg'. Those sample entry types indicate that the following restrictions are set for V3C atlas tracks:

A V3C atlas tracks with sample entries of type 'xxx1' or 'xxxg' can carry non-ACL and ACL NAL units belonging to one atlas and non-ACL NAL units of one common atlas.

A V3C atlas tracks with sample entries of type 'xxx1' or 'xxxg' contain a V3CconfigurationBox and two V3CunitHeaderBoxes in the sample entry.

When the V3C bitstream contains a single atlas and no common atlas data bitstream is present, a V3C atlas track with sample entry 'v3c1' or 'v3cg' should be used.

When the V3C bitstream contains a single atlas and common atlas data bitstream is present, a V3C atlas track with sample entry 'xxx1' or 'xxxg' can be used to indicate storage of common atlas data and the atlas data in the same track.

Under the 'v3c1', 'v3a1' and 'xxx1' sample entry, the value of array_completeness shall be 1 for arrays containing atlas parameter sets.

Under the 'v3cg', 'v3ag' and 'xxxg' sample entry, the value of array_completeness should be 0 for arrays containing atlas parameter sets.

Each sample in a V3C atlas track with sample entry of type 'xxx1' or 'xxxg' corresponds to coded atlas access unit and/or coded common atlas access unit.

In another embodiment, the indication for storing common atlas data and atlas data in the same track could be the sample entry of a V3C atlas track containing two V3C unit header boxes, one of which corresponding to V3C common atlas unit type (vuh_unit_type==V3C_CAD) and the other corresponding to V3C atlas unit type (vuh_unit_type==V3C_AD)

A V3C atlas track sample entry contains a V3CconfigurationBox and one or two V3CunitHeaderBox(es)

When the V3C bitstream contains a single atlas, a V3C atlas track with sample entry 'v3c1' or 'v3cg' shall be used.

V3C atlas track with sample entry of type 'v3c1' or 'v3cg' can contain two V3C unit header boxes in the sample entry, indicating that the atlas track contains common atlas data and atlas data.

When the V3C bitstream contains more than one atlas bitstream, each atlas bitstream should be stored as a separate V3C atlas track with the sample entry type 'v3a1' or 'v3ag'. One additional track with the sample entry type 'v3cb' should be present, which is the entry point track referencing the other atlas tracks with 'v3a1' or 'v3ag'.

Each sample in a V3C atlas track with sample entry of type 'v3c1' or 'v3cg', corresponds to a single coded atlas access unit and/or coded common atlas access unit, whereas each sample in a V3C atlas track with sample entry of type 'v3cb', corresponds to a single coded common atlas access unit.

In accordance with an embodiment, a unique four-character-code (4cc) value for item type in ItemInfoEntry would be reserved to indicate that the item contains both common atlas data and atlas data. In the example above the item type 'yyy1' is used.

A V3C atlas item is an item which represents an independently decodable coded atlas access unit and/or coded common atlas access unit depending on item type. Item type 4cc codes 'v3c1', 'v3cb', 'v3a1', and 'yyy1' identify V3C atlas items. Items of type 'v3c1', 'v3cb', and 'yyy1' shall be associated with one V3CconfigurationProperty. Atlas items of type 'v3c1', 'v3cb', and 'v3a1' shall be associated with one V3CunitHeaderProperty. Atlas items of type 'yyy1' shall be associated with two V3CunitHeaderProperties. Item data in an item with ItemInfoEntry containing item_type 'yyy1', corresponds to a single coded atlas access unit and/or coded common atlas access unit.

ItemInfoEntry containing item_type 'yyy1' shall be indicated as a primary item using PrimaryItemBox.

In the following, there is disclosed a method and apparatus for decoding. FIG. 6b depicts a method 610 for decoding according to an example embodiment as a flow diagram. The method may be implemented, for example, in a decoder 120 of FIG. 7b, which may be a part of an apparatus of FIG. 1. The decoder 120 receives 611 e.g. via the communication interface 26 an encoded V3C bitstream containing the common atlas bitstream and one or more atlas bitstreams and decodes 612 the bitstream to obtain a decoded V3C atlas track which carries the V3C unit header of the common atlas V3C_CAD and the V3C unit header of the normal atlas V3C_AD. An indication decomposer 1104 of the decoder 120 parses 613 the one track or the one item, that includes the signaling 502, and examines 614 the signaling 502. When determining, based on the signaling 502 that the track carries both the common atlas data and the normal atlas data, a file reconstructor 1105 of the decoder 610 obtains 615 the V3C unit header of the common atlas V3C_CAD and the V3C unit header of the normal atlas V3C_AD from the track and a decapsulator 1106 of the decoder uses these headers for reassembling 616 the stored common atlas and normal atlas bitstreams from the received and decoded bitstream using the signaling.

An apparatus according to an embodiment comprises means for receiving volumetric video data from a media capture system; means for encoding components of the volumetric video data into one or more visual volumetric video-based coding (V3C) sub-bitstreams of a V3C bitstream; means for transmitting information relating to one or more V3C parameter sets (VPS), the information describing the decoding requirements of the V3C bitstream, to a decoder; means for encapsulating information relating to the VPS into a real-time delivery protocol stream; and means for sending the encoded V3C sub-bitstreams and the encapsulated information over a network via the real-time delivery protocol to the decoder. The means comprises at least one processor, and a memory including a computer program code, wherein the processor may further comprise processor circuitry. The memory and the computer program code are configured to, with the at least one processor, cause the apparatus to perform the method of FIG. 5 according to various embodiments.

Figures 7A, 7B:
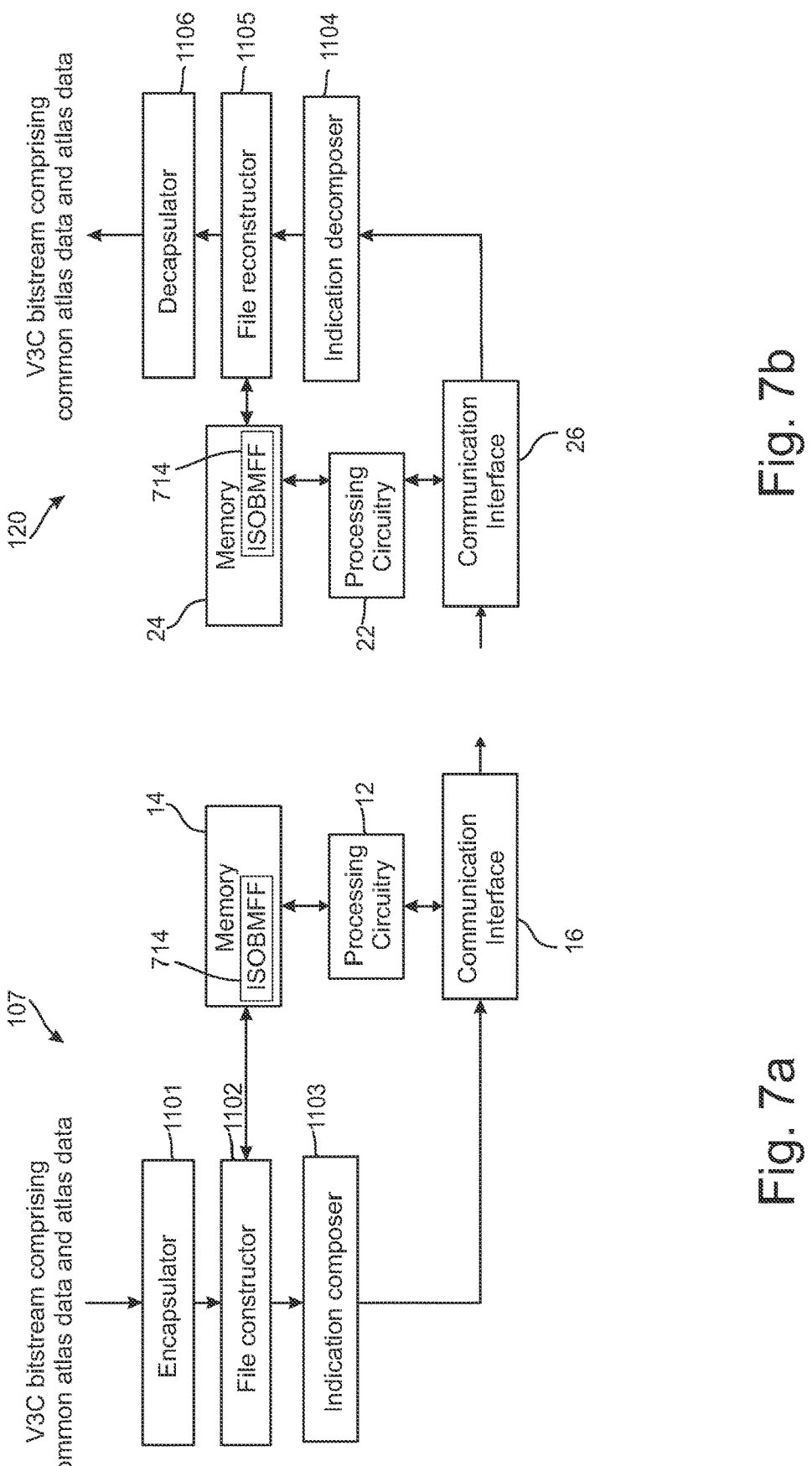
FIG. 7*a* shows an example of an encoding apparatus according to an embodiment.

Regardless of the video codec or other type of computing device that embodies the apparatus, some elements of an encoding apparatus 107 of an example embodiment is depicted in FIGS. 7a and includes, is associated with, or is otherwise in communication with processing circuitry 12, a memory 14 and a communication interface 16. The processing circuitry may be in communication with the memory device via a bus for passing information among components of the apparatus. The memory device may be non-transitory and may include, for example, one or more volatile and/or non-volatile memories. In other words, for example, the memory device may be an electronic storage device (e.g., a computer readable storage medium) comprising gates configured to store data (e.g., bits) that may be retrievable by a machine (e.g., a computing device like the processing circuitry). The memory device may be configured to store information, data, content, applications, instructions, or the like for enabling the apparatus to carry out various functions in accordance with an example embodiment of the present disclosure. For example, the memory device could be configured to buffer input data for processing by the processing circuitry. Additionally or alternatively, the memory device could be configured to store instructions for execution by the processing circuitry.

Some elements of a decoding apparatus 120 of an example embodiment is depicted in FIG. 7b and includes, is associated with, or is otherwise in communication with processing circuitry 22, a memory 24 and a communication interface 26. The processing circuitry may be in communication with the memory device via a bus for passing information among components of the apparatus. The memory device may be non-transitory and may include, for example, one or more volatile and/or non-volatile memories. In other words, for example, the memory device may be an electronic storage device (e.g., a computer readable storage medium) comprising gates configured to store data (e.g., bits) that may be retrievable by a machine (e.g., a computing device like the processing circuitry). The memory device may be configured to store information, data, content, applications, instructions, or the like for enabling the apparatus to carry out various functions in accordance with an example embodiment of the present disclosure. For example, the memory device could be configured to buffer input data for processing by the processing circuitry. Additionally or alternatively, the memory device could be configured to store instructions for execution by the processing circuitry.

The apparatuses 107, 120 may, in some embodiments, be embodied in various computing devices as described above. However, in some embodiments, the apparatus may be embodied as a chip or chip set. In other words, the apparatus may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processing circuitry 12, 22 may be embodied in a number of different ways. For example, the processing circuitry may be embodied as one or more of various hardware processing means such as a coprocessor, a microprocessor, a controller, a digital signal processor (DSP), a processing element with or without an accompanying DSP, or various other circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processing circuitry may include one or more processing cores configured to perform independently. A multi-core processing circuitry may enable multiprocessing within a single physical package. Additionally or alternatively, the processing circuitry may include one or more processors configured in tandem via the bus to enable independent execution of instructions, pipelining and/or multithreading.

In an example embodiment, the processing circuitry 12, 22 may be configured to execute instructions stored in the memory device 14, 24 or otherwise accessible to the processing circuitry. Alternatively or additionally, the processing circuitry may be configured to execute hard coded functionality. As such, whether configured by hardware or software methods, or by a combination thereof, the processing circuitry may represent an entity (e.g., physically embodied in circuitry) capable of performing operations according to an embodiment of the present disclosure while configured accordingly. Thus, for example, when the processing circuitry is embodied as an ASIC, FPGA or the like, the processing circuitry may be specifically configured hardware for conducting the operations described herein. Alternatively, as another example, when the processing circuitry is embodied as an executor of instructions, the instructions may specifically configure the processor to perform the algorithms and/or operations described herein when the instructions are executed. However, in some cases, the processing circuitry may be a processor of a specific device (e.g., an image or video processing system) configured to employ an embodiment of the present invention by further configuration of the processing circuitry by instructions for performing the algorithms and/or operations described herein. The processing circuitry may include, among other things, a clock, an arithmetic logic unit (ALU) and logic gates configured to support operation of the processing circuitry.

The communication interface 16, 26 may be any means such as a device or circuitry embodied in either hardware or a combination of hardware and software that is configured to receive and/or transmit data, including visual content in the form of video or image files, one or more audio tracks or the like. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware/software for supporting communication via cable, digital subscriber line (DSL), universal serial bus (USB) or other mechanisms.

Figure 8:
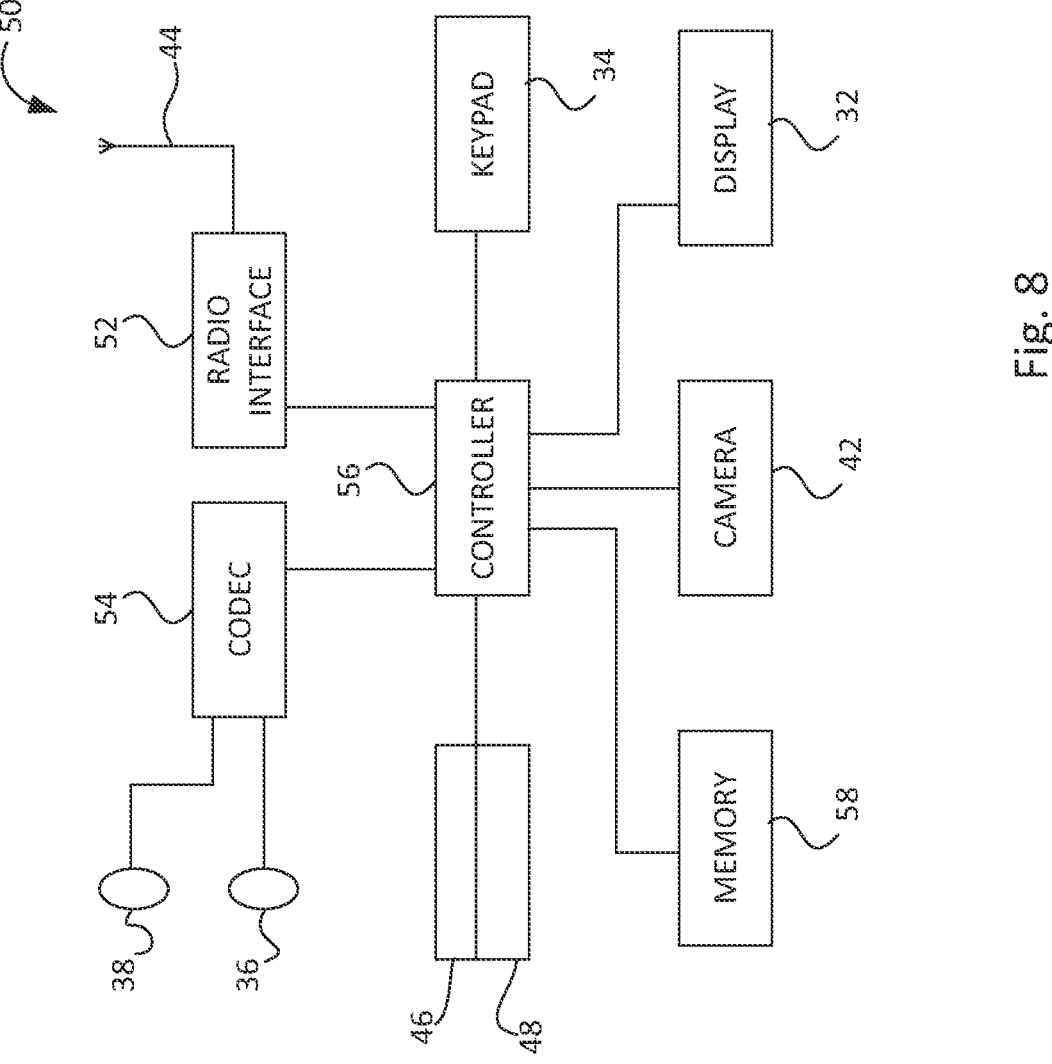
FIG. 8 shows an example of an apparatus.

An example of an apparatus is disclosed with reference to FIG. 8. FIG. 8 shows a block diagram of a video coding system according to an example embodiment as a schematic block diagram of an electronic device 50, which may incorporate a codec. In some embodiments the electronic device may comprise an encoder 100 or a decoder 120. The electronic device 50 may for example be a mobile terminal or a user equipment of a wireless communication system or a camera device. The electronic device 50 may be also comprised at a local or a remote server or a graphics processing unit of a computer. The device may be also comprised as part of a head-mounted display device. The apparatus 50 may comprise a display 32 in the form of a liquid crystal display. In other embodiments of the invention the display may be any suitable display technology suitable to display an image or video. The apparatus 50 may further comprise a keypad 34. In other embodiments of the invention any suitable data or user interface mechanism may be employed. For example, the user interface may be implemented as a virtual keyboard or data entry system as part of a touch-sensitive display. The apparatus may comprise a microphone 36 or any suitable audio input which may be a digital or analogue signal input. The apparatus 50 may further comprise an audio output device which in embodiments of the invention may be any one of: an earpiece 38, speaker, or an analogue audio or digital audio output connection. The apparatus 50 may also comprise a battery (or in other embodiments of the invention the device may be powered by any suitable mobile energy device such as solar cell, fuel cell or clockwork generator). The apparatus may further comprise a camera 42 capable of recording or capturing images and/or video. The camera 42 may be a multi-lens camera system having at least two camera sensors. The camera is capable of recording or detecting individual frames which are then passed to the codec 54 or the controller for processing. The apparatus may receive the video and/or image data for processing from another device prior to transmission and/or storage.

The apparatus 50 may comprise a controller 56 or processor for controlling the apparatus 50. The apparatus or the controller 56 may comprise one or more processors or processor circuitry and be connected to memory 58 which may store data in the form of image, video and/or audio data, and/or may also store instructions for implementation on the controller 56 or to be executed by the processors or the processor circuitry. The controller 56 may further be connected to codec circuitry 54 suitable for carrying out coding and decoding of image, video and/or audio data or assisting in coding and decoding carried out by the controller.

The apparatus 50 may further comprise a card reader 48 and a smart card 46, for example a UICC (Universal Integrated Circuit Card) and UICC reader for providing user information and being suitable for providing authentication information for authentication and authorization of the user at a network. The apparatus 50 may comprise radio interface circuitry 52 connected to the controller and suitable for generating wireless communication signals for example for communication with a cellular communications network, a wireless communications system, or a wireless local area network. The apparatus 50 may further comprise an antenna 44 connected to the radio interface circuitry 52 for transmitting radio frequency signals generated at the radio interface circuitry 52 to other apparatus(es) and for receiving radio frequency signals from other apparatus(es). The apparatus may comprise one or more wired interfaces configured to transmit and/or receive data over a wired connection, for example an electrical cable or an optical fiber connection.

The various embodiments can be implemented with the help of computer program code that resides in a memory and causes the relevant apparatuses to carry out the method. For example, a device may comprise circuitry and electronics for handling, receiving, and transmitting data, computer program code in a memory, and a processor that, when running the computer program code, causes the device to carry out the features of an embodiment. Yet further, a network device like a server may comprise circuitry and electronics for handling, receiving, and transmitting data, computer program code in a memory, and a processor that, when running the computer program code, causes the network device to carry out the features of various embodiments.

If desired, the different functions discussed herein may be performed in a different order and/or concurrently with other. Furthermore, if desired, one or more of the above-described functions and embodiments may be optional or may be combined.

Although various aspects of the embodiments are set out in the independent claims, other aspects comprise other combinations of features from the described embodiments and/or the dependent claims with the features of the independent claims, and not solely the combinations explicitly set out in the claims.

It is also noted herein that while the above describes example embodiments, these descriptions should not be viewed in a limiting sense. Rather, there are several variations and modifications, which may be made without departing from the scope of the present disclosure as, defined in the appended claims.

The invention claimed is:

1. An apparatus for encapsulating, comprising:
   at least one processor; and
   at least one memory storing instructions that, when executed with the at least one processor, cause the apparatus to perform:
   receiving a visual volumetric video-based coding bitstream containing at least one common atlas bitstream and one or more atlas bitstreams;
   storing the at least one common atlas bitstream and the one or more atlas bitstreams in samples of one track or in an item data of one item in a file;
   providing signaling in the file that indicates that the samples of the one track or the item data of the one item contains both common atlas data and atlas data; and
   writing in the file the signaling and the samples of the one track or the item data of the one item containing both common atlas data and atlas data.

2. The apparatus according to claim 1, wherein the instructions, when executed with the at least one processor, cause the apparatus to perform providing the signaling through a unique character-code value of a sample entry type for a track.

3. The apparatus according to claim 1, wherein the instructions, when executed with the at least one processor, cause the apparatus to perform providing the signaling through a sample entry of a track containing one V3CUnitHeaderBox corresponding to a visual volumetric video-based coding common atlas unit type and one V3CUnitHeaderBox corresponding to a visual volumetric video-based coding atlas unit type.

4. The apparatus according to claim 1, wherein the instructions, when executed with the at least one processor, cause the apparatus to perform providing the signaling through a unique character-code value of an item type in an ItemInfoEntry for an item.

5. The apparatus according to claim 2, wherein the unique character-code value is a three-, four-, five-, or six-character-code value.

6. The apparatus according to claim 5, wherein the unique character-code value is the four-character-code value.

7. The apparatus according to claim 1, wherein the instructions, when executed with the at least one processor, cause the apparatus to perform providing the signaling through associated item properties, at least one V3CUnitHeaderProperty corresponding to a visual volumetric video-based coding common atlas unit type and one or more V3CUnitHeaderProperty corresponding to a visual volumetric video-based coding atlas unit type.

8. The apparatus according to claim 1, wherein the instructions, when executed with the at least one processor, cause the apparatus to perform encapsulating non-atlas coding layer network abstraction layer units and atlas coding layer network abstraction layer units from the common atlas data and the atlas data to the one track or the one item.

9. The apparatus according to claim 1, wherein the file is in ISO Base Media File Format.

10. The apparatus according to claim 4, wherein the instructions, when executed with the at least one processor, cause the apparatus to perform marking the item as a primary item.

11. A method for encapsulating, comprising:
   receiving a visual volumetric video-based coding bitstream containing at least one common atlas bitstream and one or more atlas bitstreams;
   storing the at least one common atlas bitstream and the one or more atlas bitstreams in samples of one track or in item data of one item in a file;
   providing signaling in the file that indicates that the samples of the one track or the item data of the one item contains both common atlas data and atlas data; and
   writing in the file the signaling and the samples of the one track or the item data of the one item containing both common atlas data and atlas data.

12. An apparatus for decapsulating, comprising:
   at least one processor; and
   at least one memory storing instructions that, when executed with the at least one processor, cause the apparatus to perform:
   reading a file comprising a track or an item of a visual volumetric video-based coding;
   examining signaling in the track or the item;
   determining, based on the signaling, that the track or the item comprises one common atlas bitstream and one atlas bitstream;
   obtaining a visual volumetric video-based coding unit header of the one common atlas bitstream and a visual volumetric video-based coding unit header of the one atlas bitstream from the track or the item; and reassembling the one common atlas bitstream and the one atlas bitstream from the file with the signaling.

13. The apparatus according to claim 12, wherein the instructions, when executed with the at least one processor, cause the apparatus to perform the signaling through a unique character-code value of a sample entry type for the track.

14. The apparatus according to claim 12, wherein the instructions, when executed with the at least one processor, cause the apparatus to perform providing the signaling through a sample entry of the track containing one V3CUnitHeaderBox corresponding to a visual volumetric video-based coding common atlas unit type and one V3CUnitHeaderBox corresponding to a visual volumetric video-based coding atlas unit type.

15. The apparatus according to claim 12, wherein the instructions, when executed with the at least one processor, cause the apparatus to perform providing the signaling through a unique character-code value of an item type in an ItemInfoEntry for the item.

16. The apparatus according to claim 13, wherein the unique character-code value is a three-, four-, five-, or six-character-code value.

17. The apparatus according to claim 16, wherein the unique character-code value is the four-character-code value.

18. The apparatus according to claim 12, wherein the instructions, when executed with the at least one processor, cause the apparatus to perform providing the signaling through associated item properties, at least one V3CUnitHeaderProperty corresponding to a visual volumetric video-based coding common atlas unit type and one or more V3CUnitHeaderProperty corresponding to a visual volumetric video-based coding atlas unit type.

19. A method for decapsulating, comprising:
reading a file comprising a track or an item of a visual volumetric video-based coding;
examining signaling in the track or the item;
determining, based on the signaling, that the track or the item comprises one common atlas bitstream and one atlas bitstream;
obtaining a visual volumetric video-based coding unit header of the one common atlas bitstream and a visual volumetric video-based coding unit header of the one atlas bitstream from the track or the item; and
reassembling the one common atlas bitstream and the one atlas bitstream from the read file with the signaling.

* * * * *